(12) United States Patent
Kawano et al.

(10) Patent No.: US 6,835,924 B2
(45) Date of Patent: Dec. 28, 2004

(54) OPTICAL ENCODER FOR DETECTING CHANGES IN DIFFRACTION INTERFERENCE PATTERNS

(75) Inventors: Katsunori Kawano, Ashigarakami-gun (JP); Tatsuya Maruyama, Ashigarakami-gun (JP); Jiro Minabe, Ashigarakami-gun (JP); Shin Yasuda, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 70 days.

(21) Appl. No.: 10/229,040

(22) Filed: Aug. 28, 2002

(65) Prior Publication Data

US 2003/0141441 A1 Jul. 31, 2003

(30) Foreign Application Priority Data

Jan. 30, 2002 (JP) ........................................ 2002-021536

(51) Int. Cl.[7] ................................................ G01D 5/34
(52) U.S. Cl. .............................. 250/231.13; 250/237 G
(58) Field of Search ....................... 250/231.13–231.19, 250/237 G, 225; 356/614–622

(56) References Cited

U.S. PATENT DOCUMENTS 6,512,085 B1 * 1/2003 Minabe et al. .............. 528/480

OTHER PUBLICATIONS

Tomiya, "Ultra Precision Opto–Electrical Linear Encoder with Hologram Scale" and Osaki, "Hikari Gijyutsu Kontakuto", Optical and Electro–Optical Engineering Contact, vol. 38, No. 6, pp. 368–376, 2000.

Todorov et al., "Polarization holography. 1: A new high–efficiency organic material with reversible photoinduced birefringence", Applied Optics, vol. 23, No. 23, pp. 4309–4312. Dec. 1984.

Labarthet et al., "Polarization analysis of diffracted orders from a birefringence grating recorded on azobenzene containing polymer", Applied Physics Letters, vol. 75, No. 10, pp. 1377–1379, 1999.

Ueki et al., "Single–Transverse–Mode 3.4–mW Emission of Oxide–Confined 780–nm VCSEL's". IEEE Photonics Technology Letters, vol. 11, No. 12, pp. 1539–1541, Dec. 1999.

* cited by examiner

Primary Examiner—Thanh X. Luu
(74) Attorney, Agent, or Firm—Oliff & Berridge, PLC (57) ABSTRACT

Laser light emitted from a laser light source is irradiated onto a transmission-type scale, and is diffracted by a polarization hologram recorded on the transmission-type scale. Only polarization directions of ±1-order diffracted lights, among diffracted lights, are rotated by 90°. The ±1-order diffracted lights interfere with one another such that interference fringes are formed on a light-receiving surface of a photo-detector. Interference light of the ±1-order diffracted lights is transmitted through a polarizing plate. A portion of transmitted light is passed through respective slits of a slit plate and is irradiated onto the photo-detector, and intensity of irradiated light is detected. On the other hand, 0-order diffracted light, ±2-order diffracted lights, and the like, whose polarization directions are not rotated, cannot pass through the polarizing plate, and are blocked before being detected at the photo-detector.

12 Claims, 6 Drawing Sheets

OPTICAL ENCODER FOR DETECTING CHANGES IN DIFFRACTION INTERFERENCE PATTERNS

BACKGROUND OF THE INVENTION

1. Field of the Invention

The present invention relates to an optical encoder and a scale for an encoder, and in particular, to an optical encoder which detects an amount of movement of a scale by utilizing changes in a diffraction interference pattern accompanying movement of the scale, and to a scale for an encoder which is used in the optical encoder.

2. Description of the Related Art

In recent years, as semiconductor devices and optical devices have become more precise, displacement detecting systems which have high resolution and are highly precise, such as laser interferometric measuring machines and the like, have come to be used. Most recently, attention has focused on an extremely high precision optical linear encoder using a hologram scale (hereinafter called "hologram encoder") as a high-performance displacement detecting system which rivals laser interferometric measuring machines.

At a hologram scale, the wave front of light is directly recorded on a graduation surface in the form of a hologram. In light of the principles of the method of manufacturing thereof, the finest graduation pitch which is of the order of the wavelength of the light can be realized. A hologram encoder detects displacement by using the interference of the diffracted light caused by the hologram recorded on the scale, and has the highest resolution and precision among various types of linear encoders.

Figure 9:
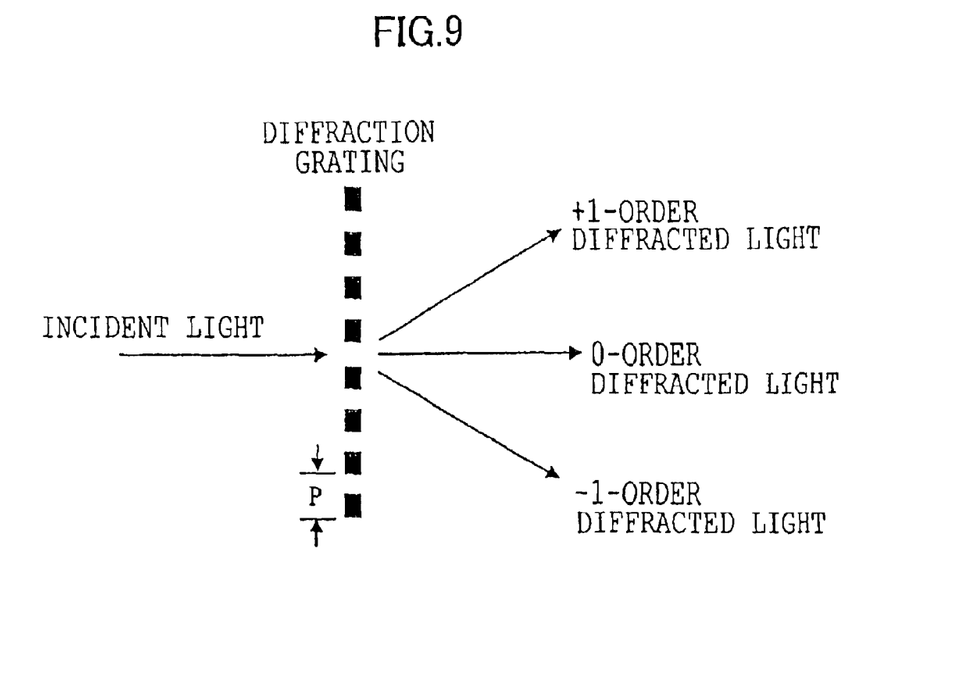
FIG. 9 is a diagram showing a state of diffraction due to a diffraction grating (hologram scale).

As will be described hereinafter, the hologram encoder utilizes the interference of diffracted light in the principles of detection, and the hologram scale can be regarded as a diffraction grating. The state of diffraction by the diffraction grating (hologram scale) is illustrated in FIG. 9. Generally, a diffraction grating generates diffracted lights of plural orders, such as 0-order diffracted light, ±1-order diffracted lights, and the like. In displacement detection, the interference of the ±1-order diffracted lights is utilized. P is the pitch of the diffraction grating, i.e., the graduation pitch of the hologram scale.

Figure 10:
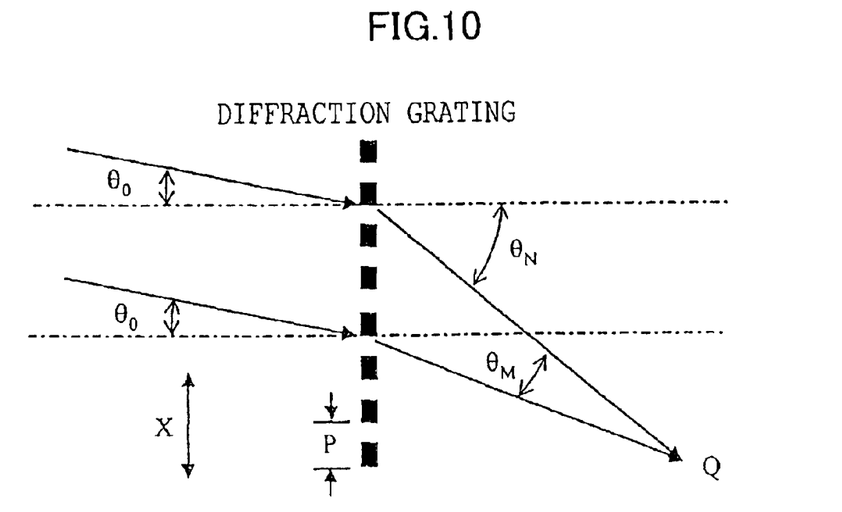
FIG. 10 is an explanatory diagram for explanation of principles of detection of a conventional hologram encoder.

In order to understand the principles of detection, with reference to FIG. 10, we consider interference of +M-order diffracted light and +N order diffracted light of rays incident on the diffraction grating at θ0. θN is the angle of diffraction of the +N-order diffracted light, and θM is the angle of diffraction of the +M-order diffracted light. The relationships between the angles of diffraction and the angles of incidence θ0 are expressed by the following formulas, wherein λ is the wavelength of the light source.

$$\sin\theta_N - \sin\theta_0 = \frac{N\lambda}{P}$$

$$\sin\theta_M - \sin\theta_0 = \frac{M\lambda}{P}$$

Further, the intensity of the light I at point Q when the amplitudes of the respective interfering light waves are the same is expressed by the following formula.

$$I = 2A^2\left\{1 + \cos\frac{2\pi}{\lambda}\left[\Delta + \frac{(N-M)\lambda}{P}x\right]\right\}$$

This formula shows that, when the diffraction grating is moved in the X direction or the −x direction, the light intensity I at point Q varies sinusoidally at the period x=P/(N−M). The detecting optical system of the hologram encoder utilizes this phenomenon. For example, in a detecting optical system which makes the ±1-order diffracted lights interfere, when the scale is moved at a pitch of 1 graduation, the intensity of the light varies completely sinusoidally by two periods. Namely, in this case, the graduation pitch P of the scale is optically divided into two, and the basic resolution becomes twice as large. Further, by electrically dividing the electric signal, which is obtained by photoelectrically converting the change in the intensity of this light, by an interpolation circuit at a latter stage, a resolution which is greater than or equal to the basic resolution can be obtained.

Details of conventional hologram encoders are disclosed in, for example, "Ultra Precision Opto-Electrical Linear Encoder with Hologram Scale", by Masaki Tomiya and Motohiro Osaki in "Hikari Gijyutsu Kontakuto" ("Optical and Electro-Optical Engineering Contact"), Vol. 38, No. 6 (2000), pp. 368–376.

However, the above-described conventional hologram encoder has the serious problem that there is much noise of the detection signal. The cause thereof is that, in addition to the ±1-order diffracted lights contributing to the interference, undesirable diffracted light (e.g., 0-order diffracted light or higher-order diffracted light of an order of 2 or more) is generated by the hologram scale. A slit for detecting the interference pattern of the ±1-order diffracted lights is provided in a photo-detector, but the 0-order diffracted light or higher-order diffracted light also is passed through the slit and is simultaneously incident on the photo-detector. This is a cause of noise. If the noise becomes great, it is difficult to detect the changes in the amplitude of the aforementioned sinusoidal signal, and the sensitivity of the system with respect to positional displacement deteriorates. As a result, the resolution of the displacement measurement deteriorates.

SUMMARY OF THE INVENTION

The present invention was developed in consideration of the above-described circumstances, and an object of the present invention is to provide an optical encoder and a scale for an encoder which can reduce noise of a detection signal and can detect the amount of movement of a scale at a high resolution.

In order to achieve the above object, the optical encoder of the present invention comprises: an optical sensor section in which a scale and a detecting optical system are disposed so as to be one of relatively movable and relatively rotatable, and an optically anisotropic region, which diffracts incident laser light and selectively rotates a polarization direction of diffracted light of a predetermined order in a predetermined polarization direction, is formed at the scale, and the detecting optical system includes a light source irradiating laser light onto the scale, a polarized light separating means separating a polarized light component of the predetermined polarization direction from diffracted light which has been one of transmitted through the scale and reflected by the scale, and a light intensity detecting means detecting light intensity at a predetermined position of an interference pattern due to the polarized light component which has been separated; and movement amount computing means for computing an amount of movement of the scale on the basis of a change in the light intensity detected at the optical sensor section.

In the optical encoder, in the detecting optical system, the laser light irradiated onto the scale from the light source is diffracted by the optically anisotropic region formed at the scale. At this time, the polarization direction of diffracted light of a predetermined order is selectively rotated in a predetermined polarization direction. The polarized light separating means separates a polarized light component of a predetermined polarization direction, i.e., diffracted light of a predetermined order, from the diffracted light which has been transmitted through the scale or reflected at the scale. The light intensity detecting means detects the light intensity at a predetermined position of the interference pattern due to the diffracted light which has been separated.

In the optical sensor section, the detecting optical system and the scale are disposed so as to be relatively movable or relatively rotatable. When the detecting optical system and the scale move relative to one another or rotate relative to one another, the diffraction interference pattern changes, and the light intensity detected at the light intensity detecting means changes. Then, the movement amount computing means computes the amount of movement of the scale on the basis of the change in the light intensity detected at the optical sensor section. For example, when the light intensity detected at the light intensity detecting means changes periodically, the amount of movement of the scale can be computed by associating the period of the change in the light intensity with the diffraction pitch of the scale.

In this way, at the optical encoder of the present invention, when the laser light is diffracted by the optically anisotropic region formed at the scale, the polarization direction of diffracted light of a predetermined order is rotated. Only the interference light of the diffracted light, whose polarization direction has been rotated, is detected at the photo-detector. Thus, a detection signal in which noise is reduced can be obtained, and the amount of movement of the scale can be detected at a high resolution.

A surface-emitting laser is suitable as the light source of the optical encoder. When a surface-emitting laser is used as the light source, the spreading of the beam can be kept relatively low. Thus, because there is no need for a collimator lens or a condensing lens, the number of parts can be reduced, and the device can be made more compact.

A polarizer, such as a polarizing plate or a polarizing filter or the like which transmits a linearly polarized light component of a predetermined polarization direction from the incident light, can be used as the polarized light separating means.

The scale for an encoder used in the optical encoder has the feature that an optically anisotropic region, which diffracts incident laser light and selectively rotates a polarization direction of diffracted light of a predetermined order in a predetermined direction, is formed at the scale for an encoder.

The optically anisotropic region formed at the scale can be a region having photo-induced anisotropy which is induced by the irradiation of light. Photo-induced birefringence and photo-induced dichroism are types of photo-induced anisotropy. The optically anisotropic region may be formed by inducing birefringence by irradiating light onto one of a recording material containing a polymer compound (which may be polymer liquid crystal) having a photoisomerizing group in a side chain, and a recording material containing a polymer compound in which photoisomerizing molecules are dispersed.

The polymer compound preferably has a asobenzene structure, and more preferably has an aromatic hydrocarbon group in the main chain. The polyester expressed by following general formula (1) is particularly preferable.

general formula (1)

In general formula (1), X represents a cyano group, a methyl group, a methoxy group, or a nitro group; Y represents a bivalent coupling group such as an oxy group, a carbonyl group, or a sulfonyl group; and m represent integers from 2 to 18; and n represents an integer from 5 to 500.

The optically anisotropic region may be formed by, for example, recording a polarization hologram.

DETAILED DESCRIPTION OF THE PREFERRED EMBODIMENTS

Hereinafter, embodiments of the present invention will be described in detail with reference to the drawings.

First Embodiment
[Structure of Optical Encoder]

Figure 1:
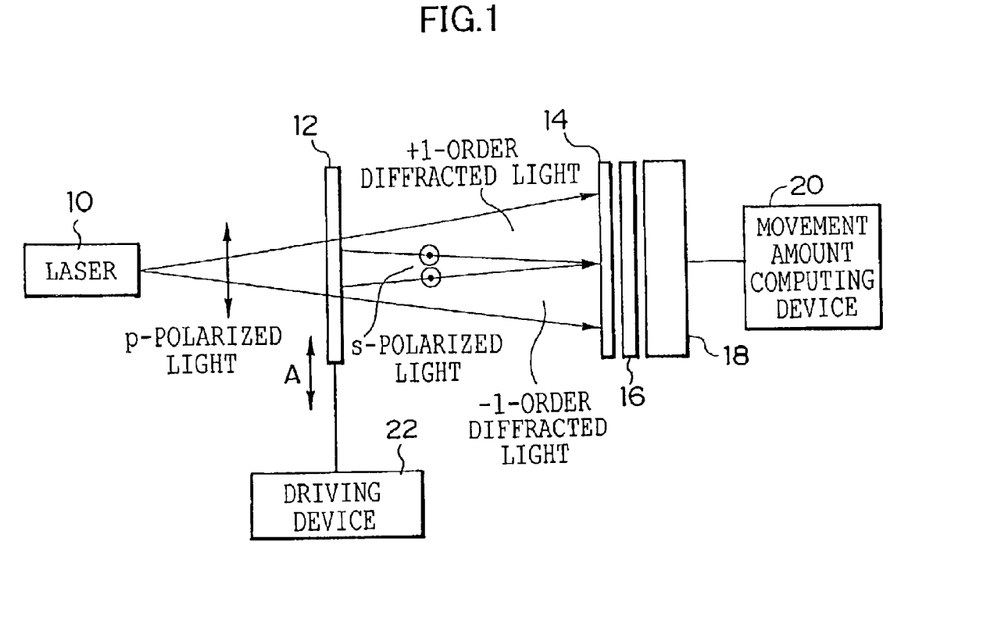
FIG. 1 is schematic diagram showing the structure of an optical encoder relating to a first embodiment.

As shown in FIG. 1, an optical encoder relating to a first embodiment of the present invention is equipped with a laser light source 10 which outputs linearly polarized light of a predetermined polarization direction. A transmission-type scale 12 which is elongated and at which a polarization hologram is recorded, a polarizing plate 14 which selectively transmits linearly polarized light of a predetermined polarization direction, a slit plate 16 in which slits are formed at predetermined intervals, and a photo-detector 18 which detects the intensity of the laser light passed through the slit plate 16, are disposed in that order at the light exiting side of the laser light source 10.

The transmission-type scale 12 is disposed such that laser light is substantially orthogonally incident thereon from a recording layer side which will be described later. The transmission-type scale 12 is structured so as to be movable along the directions of arrow A which runs along the longitudinal direction of the scale, via an unillustrated driving mechanism which is controlled by a driving device 22. Further, the photo-detector 18 is connected to a movement amount computing device 20 which computes the amount of movement on the basis of the detection signal of the photo-detector 18. The movement amount computing device 20 can be structured by, for example, a personal computer equipped with a CPU, a ROM, and a RAM.

The laser light source 10 is formed by a surface-emitting laser which can emit laser light from a substrate surface. A surface-emitting laser can keep the spreading of the beam diameter relatively low due to the design of the configuration of the aperture. Thus, because there is no need for a collimator lens or a condensing lens, a surface-emitting laser is advantageous in making the device smaller and lower cost. For example, the vertical cavity surface-emitting lasers (VCSEL) disclosed in IEEE Photon. Technol. Lett., 11, 1539 (1999) or the like can be suitably used.

Figure 2:
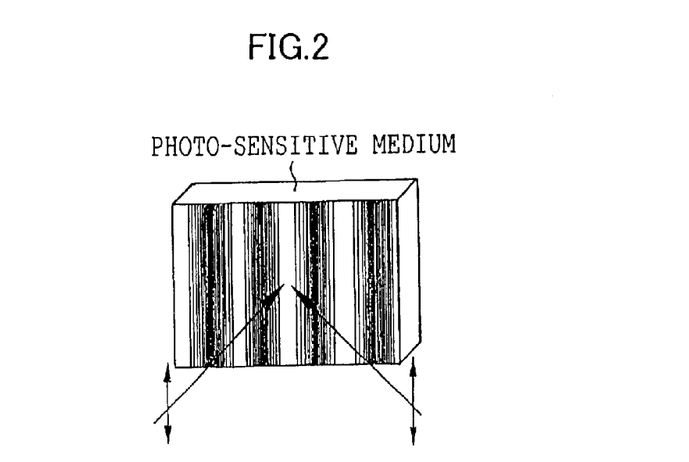
FIG. 2 is a perspective view for explanation of principles of diffraction of a conventional hologram.

The polarization hologram recorded on the transmission-type scale 12 works as a diffraction grating. Here, the principles of diffraction of the polarization hologram will be described in comparison with the principles of diffraction of a conventional hologram. As shown in FIG. 2, a conventional hologram is formed by irradiating, onto a photo-sensitive medium, interference fringes of two coherent light waves, such that changes in the refractive index or changes in the absorptance corresponding to the light intensity distribution are recorded. In this case, in order to increase the contrast of the interference fringes, polarizations of two light waves are set as linearly polarized lights of the same direction. In this hologram, the incident light is diffracted without the polarization direction thereof being changed.

Figure 3A:
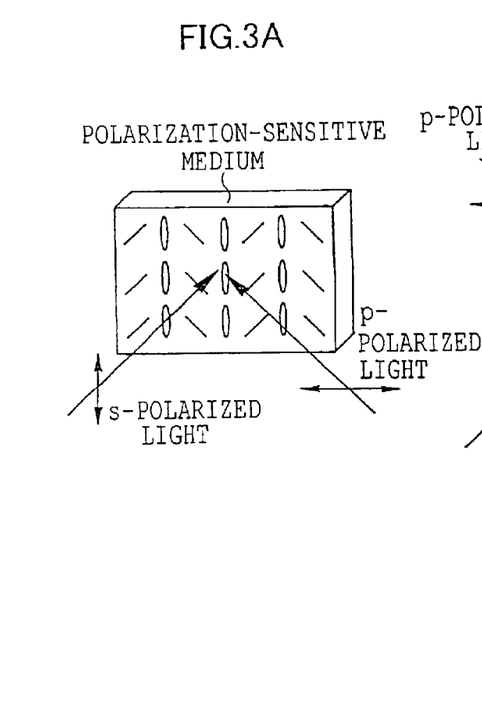
FIG. 3A is a perspective view showing a method of recording a polarization hologram.

On the other hand, as shown in FIG. 3A, when the polarization hologram is recorded, two light waves (e.g., p-polarized light which is parallel to the surface of FIG. 3A and s-polarized light orthogonal thereto) having polarization states which are mutually orthogonal are irradiated onto a polarization-sensitive medium exhibiting photo-induced anisotropy (Weigert's effect). At this time, no interference fringes due to the two light waves arise in the medium. However, a spatial polarization distribution due to the composition of the electric field vectors of the two light waves is formed. Photo-induced anisotropy is expressed in accordance with the spatial polarization distribution, and this is recorded. This is the polarization hologram. Details of polarization holography are disclosed in T. Todorov, L. Nikolova, and N. Tomova, Appl. Opt. 23, 4309 (1984) and the like.

Figure 3B:
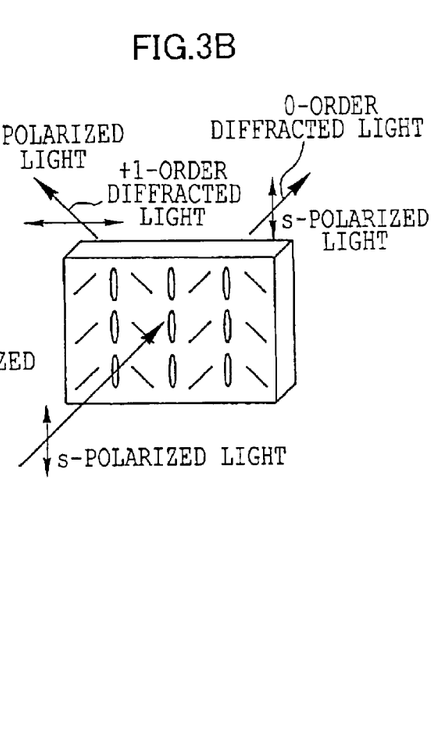
FIG. 3B is a perspective view for explanation of principles of diffraction by the polarization hologram recorded in FIG. 3A.

In the same way as a conventional hologram, the polarization hologram works as a diffraction grating and diffracts the incident light, and rotates by 90° only the polarization directions of the diffracted lights of the odd-numbered orders. For example, as shown in FIG. 3B, assuming that the laser light which is incident is s-polarized light, the ±1-order diffracted lights by the polarization hologram become p-polarized light which is 90° orthogonal to the polarization direction of the incident light, whereas the 0-order diffracted light and the ±2-order diffracted lights remain as is as s-polarized lights. Usually, diffracted lights of higher-orders such as 3-order or more can be ignored. Reasons why the effects differ due to the orders of the diffracted lights in this way are explained in detail in F. Lagugne Labarthet, P. Rochon, A. Natansohn, Appl. Phys. Lett., Vol. 75, No. 10, 1377(1999) and the like.

Figure 3C:
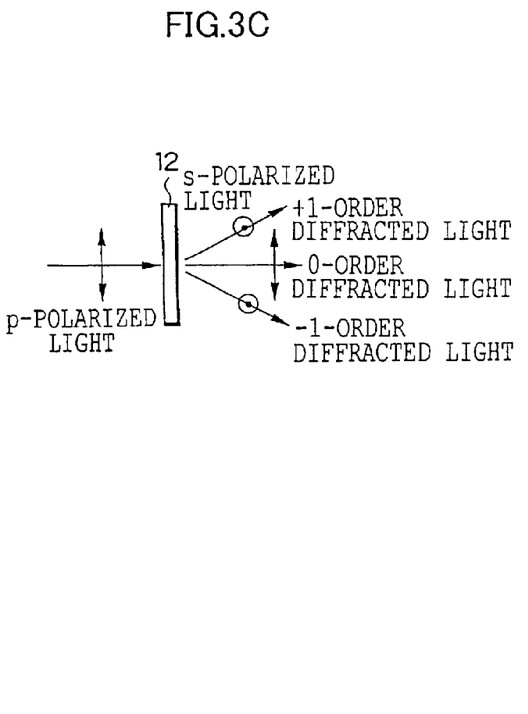
FIG. 3C is a schematic diagram showing an example of a polarization distribution of diffracted light in a case in which p-polarized light is incident on a transmission-type scale.

Accordingly, as shown in FIG. 3C, when p-polarized light is incident on the transmission-type scale 12 on which the polarization hologram is recorded such that the diffraction efficiencies of the ±1-order diffracted lights are each about 30%, the 0-order diffracted light which is p-polarized light and the ±1-order diffracted lights which are s-polarized lights are outputted substantially uniformly.

The polarizing plate 14 has a transmission axis which is orthogonal to the polarization direction of the laser light emitted from the laser light source 10. Only ±1-order diffracted lights, whose polarization directions have been rotated by 90° by the polarization hologram, are transmitted through the polarizing plate 14.

In the slit plate 16, slits are formed at pitches corresponding to the light intensity pattern (the diffraction interference pattern) formed by the interference of the ±1-order diffracted lights due to the polarization hologram. In this way, specific portions of the generated diffraction interference pattern are transmitted through the slits and are incident on the photo-detector, and the detection strength improves.

A plurality of light-receiving regions corresponding to the respective slits of the slit plate 16 are formed at the photo-detector 18. The efficiency of detecting the light intensity is improved by providing the light-receiving regions corresponding to the slits.

[Fabrication of Transmission-Type Scale]

Figure 4A:
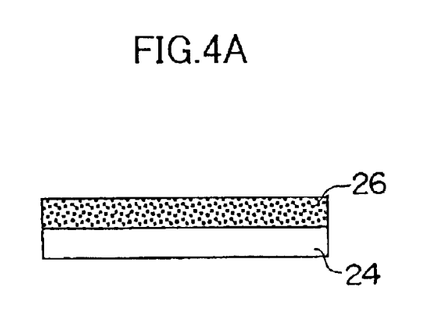
FIG. 4A is a cross-sectional view showing a layer structure of a recording medium used in fabricating the transmission-type scale.

The transmission-type scale 12 can be fabricated by utilizing the recording medium shown in FIG. 4A, in which a recording layer 26, which is formed from a polarization-sensitive medium which exhibits photo-induced anisotropy (birefringence or dichroism) and at which the induced anisotropy can be recorded and held, is formed on one surface of a transparent substrate 24 which is a glass substrate or the like, and by recording the polarization hologram on the recording layer 26 of this recording medium.

Polymers having an azobenzene structure (hereinafter called "azopolymers"), which having a high photo-induced birefringence and can obtain a high diffraction efficiency and have excellent recording stability, are suitable as the polarization-sensitive medium forming the recording layer 26. When linearly polarized light is irradiated onto azobenzene, the azobenzene which is oriented in the polarization direction of the linearly polarized light exhibits a trans-cis-trans photoisomerization cycle as follows.

excited light (pump beam)

When the trans-isomer relaxes in a direction orthogonal to the polarization direction, it is no longer excited by the light and remains stable in the state thereof. In this way, in the azobenzene, the trans-isomers are oriented in a direction orthogonal to the polarization direction of the irradiated light. Due to this orientation, birefringence and dichroism are induced. Among azopolymers, a polyester, which is shown by the following formula and has an aromatic hydrocarbon group in the main chain and an azobenzene structure in the side chain, is suitable as the material of the recording layer because it has particularly high photo-induced birefringence and stability.

In the formula, X represents a cyano group, a methyl group, a methoxy group, or a nitro group, and Y represents a bivalent coupling group such as an oxy group, a carbonyl group, or a sulfonyl group. Further, l and m represent integers from 2 to 18 and more preferably from 4 to 10, and n represents an integer from 5 to 500 and more preferably from 10 to 100.

Figure 5:
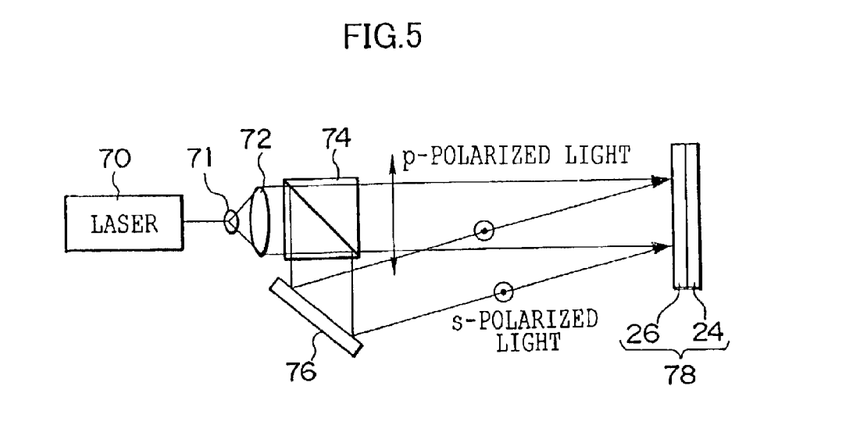
FIG. 5 is a cross-sectional view taken along an optical axis and showing the structure of an optical system for fabricating a scale by recording a polarization hologram.

Next, an example of fabricating the scale by using the optical system shown in FIG. 5 will be described. Using an argon ion laser having an oscillation line of 515 nm as a laser light source 70, the laser light emitted from the laser light source 70 was made into parallel beam expanded by collimator lenses 71, 72, and was made incident on a polarizing beam splitter 74, such that the incident light was divided into two light waves having polarization states orthogonal to one another (e.g., linearly polarized lights having mutually orthogonal polarization directions, such as s-polarized light and p-polarized light). The reflected light (e.g., the s-polarized light) was reflected by a reflecting mirror 76 and irradiated and the transmitted light (e.g., the p-polarized light) was irradiated, so as to record a polarization hologram on a recording medium 78 in which an azopolymer layer of a thickness of 10 μm was provided as the recording layer 26. Note that the thickness of the azopolymer layer can be appropriately changed in accordance with the desired hologram diffraction efficiency.

When the exposure energy at the time of recording the polarization hologram was 1 J/cm$^2$, the diffraction efficiency at laser light with a wavelength of 600 nm or more which are not sensitive to azopolymers was about 50%, and the highest diffraction efficiency was obtained.

[Operation of Optical Encoder]

Next, operation of the optical encoder shown in FIG. 1 will be described. Laser light, which is emitted from the laser light source 10 as linearly polarized light having a predetermined polarization direction, is irradiated onto the transmission-type scale 12 disposed at the light exiting side, and is diffracted by the polarization hologram recorded on the transmission-type scale 12. Only the polarization directions of the ±1-order diffracted lights among the diffracted lights are rotated by 90°. These ±1-order diffracted lights interfere with one another, and a light intensity pattern (interference fringes) due to the interference is formed on the light-receiving surface of the photo-detector 18.

The interference light of the ±1-order diffracted lights whose polarization directions were rotated by 90° is transmitted through the polarizing plate 14 which has a transmission axis orthogonal to the polarization direction of the laser light emitted from the laser light source 10. A portion of the interference light which is transmitted through the polarizing plate 14 is passed through the respective slits of the slit plate 16, and is irradiated onto the respective light-receiving regions of the photo-detector 18 which are formed in correspondence with the respective slits, and the intensity of the irradiated light is detected at the photo-detector 18. On the other hand, the 0-order diffracted light and the ±2-order diffracted lights whose polarization directions were not rotated, and the interference lights thereof, cannot pass through the polarizing plate 14, and are blocked before being detected at the photo-detector 18.

When the transmission-type scale 12 is moved in the direction of arrow A via the unillustrated driving mechanism by the driving device 22, in accordance with the principles of detection of the above-described hologram encoder, as the transmission-type scale 12 moves, the light intensity detected at the respective light-receiving regions of the photo-detector 18 changes periodically, and a sinusoidal detection signal is outputted to the movement amount computing device 20. When the transmission-type scale 12 moves by one pitch of the diffraction grating, a sinusoidal signal of two periods is detected, and at the movement amount computing device 20, the amount of movement of the transmission-type scale 12 is computed on the basis of the detection signal. For example, the amount of movement can be computed by using the wave number of the detection signal and the length of one pitch of the diffraction grating, i.e., the grating constant.

As described above, in the optical encoder relating to the present embodiment, the polarization directions of the ±1-order diffracted lights are rotated 90° by the polarization hologram recorded on the transmission-type scale, and noise light which is not needed is blocked by the polarizing plate such that only the diffraction interference light which is required for movement amount (displacement) measurement is detected at the photo-detector. Thus, the S/N of the detection signal can be improved, and the amount of movement of the scale can be detected at a high resolution.

Further, because a surface-emitting laser, which can keep the spreading of the beam relatively low, is used as the light source, there is no need for a collimator lens or a condensing lens. Thus, the device can be made more compact and less expensive.

Moreover, the slit plate, in which the slits are formed at predetermined intervals, is disposed at the light incident side of the photo-detector, and specific portions of the generated diffraction interference pattern are passed through the slits and are incident on the photo-detector. Thus, the detection strength can be improved. Moreover, because the photo-detector, at which a plurality of light-receiving regions corresponding to the respective slits are formed, is used, the light intensity can be detected efficiently.

Second Embodiment

[Structure of Optical Encoder]

Figure 6:
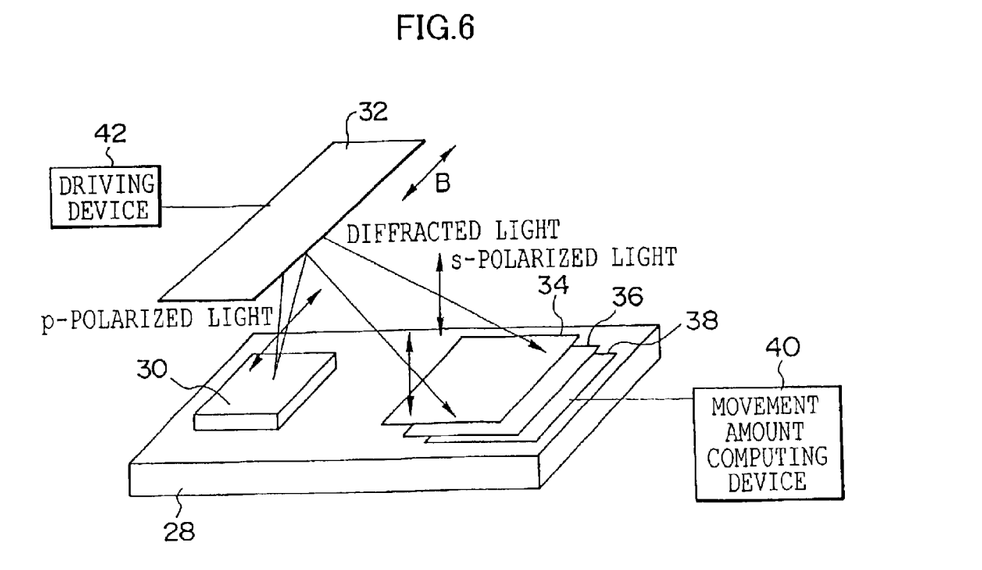
FIG. 6 is a schematic diagram showing the structure of an optical encoder relating to a second embodiment.

As shown in FIG. 6, an optical encoder relating to a second embodiment of the present invention is equipped with a laser light source 30 which outputs linearly polarized light of a predetermined polarization direction. A reflection-type scale 32, which is elongated and at which a polarization hologram is recorded, is disposed at the light exiting side of the laser light source 30. A polarizing plate 34 which selectively transmits linearly polarized light of a predetermined polarization direction, a slit plate 36 in which slits are formed at predetermined intervals, and a photo-detector 38 which detects the intensity of the laser light passed through the slit plate 36, are disposed in that order on the optical path of the light reflected by the reflection-type scale 32.

The laser light source 30 is formed by a surface-emitting laser which can emit laser light from a substrate surface. The laser light source 30 and the photo-detector 38 are provided monolithically on a common substrate 28.

The reflection-type scale 32 is disposed above the laser light source 30 so as to be tilted at a predetermined angle with respect to the direction in which the light exits from the light source, so that the incident light is reflected in a direction which is different from the direction of incidence. The reflection-type scale 32 is structured so as to be movable along the directions of arrow B which runs along the longitudinal direction of the scale, via an unillustrated driving mechanism which is controlled by a driving device 42. Further, the photo-detector 38 is connected to a movement amount computing device 40 which computes the amount of movement on the basis of the detection signal of the photo-detector 38. The movement amount computing device 40 can be structured by, for example, a personal computer equipped with a CPU, a ROM, and a RAM.

Figure 7:
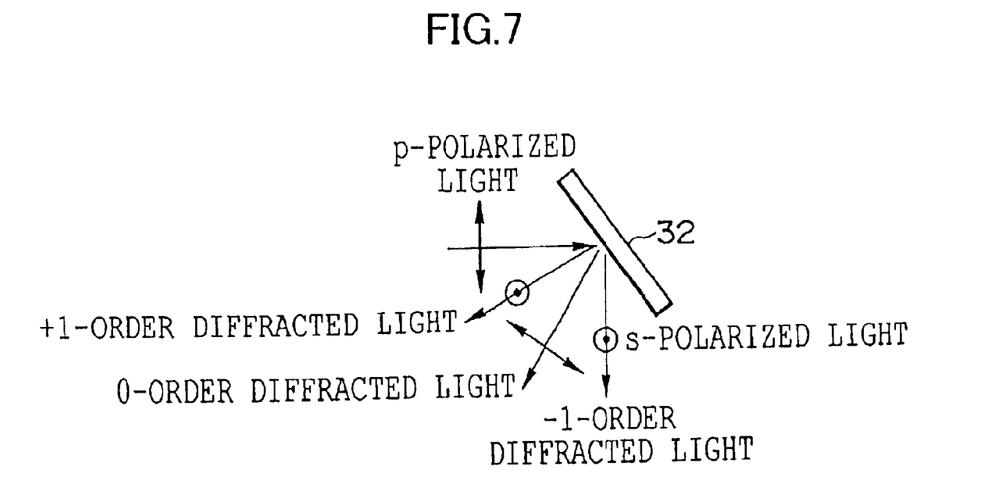
FIG. 7 is a schematic diagram showing an example of a polarization distribution of diffracted light in a case in which p-polarized light is incident on a reflection-type scale.

The polarization hologram recorded on the reflection-type scale 32 is similar to that in the case of the transmission-type scale with regard to the points that the polarization hologram works as a diffraction grating and diffracts the incident light, and rotates by 90° only the polarization directions of the diffracted lights of odd-numbered orders. When the laser light which is incident is p-polarized light, the ±1-order diffracted lights by the polarization hologram become s-polarized lights which are 90° orthogonal to the polarization direction of the incident light, whereas the 0-order diffracted light and the ±2-order diffracted lights remain as is as p-polarized lights. For example, as shown in FIG. 7, when p-polarized light is incident on the reflection-type scale 32 on which the polarization hologram is recorded such that the diffraction efficiencies of the ±1-order diffracted lights are each about 30%, the 0-order diffracted light which is p-polarized light and the ±1-order diffracted lights which are s-polarized lights are outputted substantially uniformly.

The polarizing plate 34 has a transmission axis which is orthogonal to the polarization direction of the laser light emitted from the laser light source 30. In the slit plate 36, slits are formed at pitches corresponding to the light intensity pattern formed by the interference of the ±1-order diffracted lights due to the polarization hologram. A plurality of light-receiving regions corresponding to the respective slits of the slit plate 36 are formed at the photo-detector 38.

[Fabrication of Reflection-Type Scale]

Figure 4B:
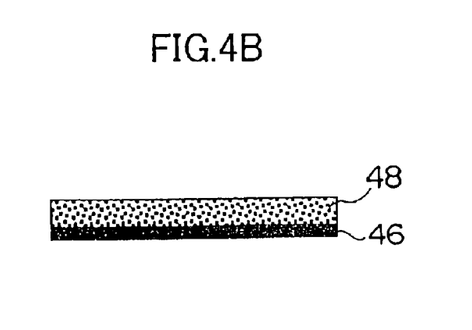
FIG. 4B is a cross-sectional view showing a layer structure of a recording medium used in fabricating a reflection-type scale.

The reflection-type scale 32 can be fabricated by utilizing the recording medium shown in FIG. 4B, in which a recording layer 48, which is formed from a polarization-sensitive medium which exhibits photo-induced anisotropy and at which the induced anisotropy can be recorded and held, is formed on one surface of a reflecting member 46 of metal plate or the like, and by recording the polarization hologram on the recording layer 48 of this recording medium. The laser light, which is incident from the recording layer 48 side of the reflection-type scale 32, is transmitted through the recording layer 48, is reflected at the surface of the reflecting member 46, is again transmitted through the recording layer 48, and exits therefrom. In the same way as the transmission-type scale, an azopolymer is suitable as the recording material forming the recording layer 48. Further, the polarization hologram can be recorded on the recording layer 48 formed of an azopolymer, by the same method as in the case of the transmission-type scale.

[Operation of Optical Encoder]

Next, operation of the optical encoder shown in FIG. 6 will be described. Laser light, which is emitted from the laser light source 30 as linearly polarized light having a predetermined polarization direction, is irradiated onto the reflection-type scale 32 disposed at the light exiting side, and is diffracted by the polarization hologram recorded on the reflection-type scale 32. Only the polarization directions of the ±1-order diffracted lights among the diffracted lights are rotated by 90°. These ±1-order diffracted lights interfere with one another, and a light intensity pattern (interference fringes) due to the interference is formed on the light-receiving surface of the photo-detector 38.

The interference light of the ±1-order diffracted lights whose polarization directions were rotated by 90° is transmitted through the polarizing plate 34 which has a transmission axis orthogonal to the polarization direction of the laser light emitted from the laser light source 30. A portion of the interference light which is transmitted through the polarizing plate 34 is passed through the respective slits of the slit plate 36, and is irradiated onto the respective light-receiving regions of the photo-detector 38 which are formed in correspondence with the respective slits, and the intensity of the irradiated light is detected at the photo-detector 38. On the other hand, the 0-order diffracted light and the ±2-order diffracted lights whose polarization directions were not rotated, and the interference lights thereof, cannot pass through the polarizing plate 34, and are blocked before being detected at the photo-detector 38.

When the reflection-type scale 32 is moved in the direction of arrow B via the unillustrated driving mechanism by the driving device 42, the light intensity detected at the respective light-receiving regions of the photo-detector 38 changes periodically in accordance with the movement of the reflection-type scale 32, and a sinusoidal detection signal is outputted to the movement amount computing device 40. At the movement amount computing device 40, the amount of movement of the reflection-type scale 32 is computed on the basis of the detection signal.

As described above, in the optical encoder relating to the present embodiment, the polarization directions of the ±1-order diffracted lights are rotated 90° by the polarization hologram recorded on the reflection-type scale, and noise light which is not needed is blocked by the polarizing plate such that only the diffraction interference light which is required for movement amount (displacement) measurement is detected at the photo-detector. Thus, the S/N of the detection signal can be improved, and the amount of movement of the scale can be detected at a high resolution.

Further, because a surface-emitting laser, which can keep the spreading of the beam diameter relatively low, is used as the light source, there is no need for a collimator lens or a condensing lens, and the surface-emitting laser and the photo-detector can be formed monolithically on a common substrate. Thus, the device can be made even more compact and less expensive.

Moreover, the slit plate, in which the slits are formed at predetermined intervals, is disposed at the light incident side of the photo-detector, and specific portions of the generated diffraction interference pattern are passed through the slits and are incident on the photo-detector. Thus, the detection strength can be improved. Moreover, because the photo-detector, at which a plurality of light-receiving regions corresponding to the respective slits are formed, is used, the light intensity can be detected efficiently.

Hereinafter, suitable embodiments and other embodiments and the like of the present invention will be described.

In the optical encoder relating to the above-described embodiments, it is preferable that a polarizer be disposed between the laser light source and the scale. When the polarization state of the light emitted from the laser light source changes, the effects due to this change are reduced by the polarizer, and noise can be reduced. Further, it is preferable to dispose an aperture between the laser light source and the scale. The amplitude of the detection signal varies in accordance with the beam diameter and the scale period. Thus, when the beam diameter of the laser light emitted from the light source varies, laser light of a predetermined beam diameter is irradiated onto the scale by the aperture. Variations in the amplitude of the detection signal are prevented, and noise can be reduced.

As described above, in the first and second embodiments, description was given of examples in which laser light which is linearly polarized light is irradiated onto the scale. However, circularly polarized light or elliptically polarized light may be irradiated onto the scale. In this case, the light is converted into linearly polarized light by using a scale equipped with a quarter wave plate.

Further, in the first and second embodiments, description was given of examples in which the polarizing plate, the slit plate and the photo-detector are structured individually. However, these elements may be formed integrally by, for example, adhering a polarizing film and film-like slits onto the surface of a photo-detector, or the like.

In the first and second embodiments, description was given of examples in which a surface-emitting laser is used as the laser light source. However, a general laser light source, which is used as the light source in conventional optical encoders, may be used.

In the first and second embodiments, description was given of optical linear encoders using linear scales. However, the present invention is also applicable to rotary encoders which measure the amount of rotation of a scale by using a disc-shaped scale which rotates relative to a light source.

Moreover, in the first and second embodiments, description was given of examples in which the scale moves in a predetermined direction by a driving device. However, it suffices for the scale to move relative to the laser light source; the scale may be fixed and the laser light source moved. In this case, the photo-detector and the like must be moved accompanying the movement of the laser light source, so that the laser light, of which the polarization state is modulated by the scale, can be detected by the photo-detector. Further, description was given above of examples in which a detecting optical system including the laser light source and the photo-detector is provided for one scale. However, a plurality of detecting optical systems may be provided for one scale.

Figure 8:
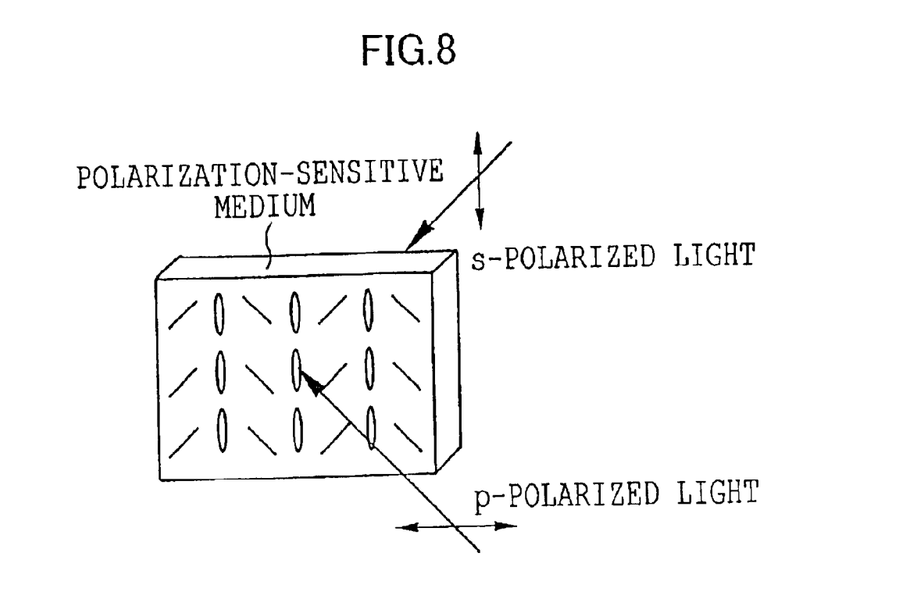
FIG. 8 is a perspective view showing another method of recording a polarization hologram.

Moreover, in the second embodiment, an example was described in which the reflection-type scale is fabricated by recording the polarization hologram on the recording surface of a recording medium having a reflecting member. However, the reflection-type scale may be fabricated by using the recording medium, which is shown in FIG. 4A and in which the recording layer 26 formed from a polarization-sensitive medium is formed on one surface of the transparent substrate 24, and, as shown in FIG. 8, the polarization hologram is recorded by irradiating two light waves, whose polarization states are orthogonal to one another, onto the recording medium from different sides.

As described above, the optical encoder of the present invention and the scale for an encoder have the effects that the noise of the detection signal can be reduced and the amount of movement of the scale can be detected at a high resolution.

What is claimed is:

1. An optical encoder comprising:
   an optical sensor section in which a scale and a detecting optical system are disposed so as to be one of relatively movable and relatively rotatable, and an optically anisotropic region, which diffracts incident laser light and selectively rotates a polarization direction of diffracted light of a predetermined order in a predetermined polarization direction, is formed at the scale, and the detecting optical system includes a light source irradiating laser light onto the scale, a polarized light separating means separating a polarized light component of the predetermined polarization direction from diffracted light which has been one of transmitted through the scale and reflected by the scale, and a light intensity detecting means detecting light intensity at a predetermined position of an interference pattern due to the polarized light component which has been separated; and
   movement amount computing means for computing an amount of movement of the scale on the basis of a change in the light intensity detected at the optical sensor section.

2. The optical encoder of claim 1, wherein a surface-emitting laser is used as the light source.

3. The optical encoder of claim 1, wherein, when the light intensity detected at the light intensity detecting means varies periodically, the movement amount computing means computes the amount of movement of the scale by associating a period of variation of the light intensity with a diffraction pitch of the scale.

4. The optical encoder of claim 1, wherein the polarized light separating means is a polarizer which transmits a linearly polarized light component of a predetermined polarization direction from incident light.

5. The optical encoder of claim 1, wherein the optically anisotropic region is a region having photo-induced anisotropy induced by irradiation of light.

6. The optical encoder of claim 5, wherein the photo-induced anisotropy is photo-induced birefringence.

7. The optical encoder of claim 1, wherein the optically anisotropic region is formed by inducing birefringence by irradiating light onto one of a recording material containing a polymer compound having a photoisomerizing group in a side chain, and a recording material containing a polymer compound in which photoisomerizing molecules are dispersed.

8. The optical encoder of claim 7, wherein the polymer compound has an azobenzene structure in a side chain.

9. The optical encoder of claim 7, wherein the polymer compound has an aromatic hydrocarbon group in a main chain.

10. The optical encoder of claim 7, wherein the polymer compound is a polyester expressed by following general formula (1):

general formula (1)

wherein, in the formula, X represents a cyano group, a methyl group, a methoxy group, or a nitro group; Y represents a bivalent coupling group such as an oxy group, a carbonyl group, or a sulfonyl group; l and m represent integers from 2 to 18; and n represents an integer from 5 to 500.

11. The optical encoder of claim 1, wherein the optically anisotropic region is formed by recording a polarization hologram.

12. The optical encoder of claim 1, wherein the optically anisotropic region selectively rotates, by 90° and in a predetermined direction, only polarization directions of diffracted lights of odd-numbered orders.

* * * * *